(12) United States Patent
Huang

(10) Patent No.: US 11,215,885 B2
(45) Date of Patent: Jan. 4, 2022

(54) LIQUID CRYSTAL DISPLAY DEVICE

(71) Applicant: TCL CHINA STAR OPTOELECTRONICS TECHNOLOGY CO., LTD., Guangdong (CN)

(72) Inventor: Gu Huang, Guangdong (CN)

(73) Assignee: TCL CHINA STAR OPTOELECTRONICS TECHNOLOGY CO., LTD., Guangdong (CN)

( * ) Notice: Subject to any disclaimer, the term of this patent is extended or adjusted under 35 U.S.C. 154(b) by 276 days.

(21) Appl. No.: 16/623,357

(22) PCT Filed: Dec. 4, 2019

(86) PCT No.: PCT/CN2019/123019
§ 371 (c)(1),
(2) Date: Dec. 16, 2019

(87) PCT Pub. No.: WO2021/097926
PCT Pub. Date: May 27, 2021

(65) Prior Publication Data
US 2021/0333660 A1    Oct. 28, 2021

(30) Foreign Application Priority Data

Nov. 20, 2019 (CN) .......................... 201911139497.4

(51) Int. Cl.
*G02F 1/1362* (2006.01)

(52) U.S. Cl.
CPC .............................. *G02F 1/136204* (2013.01)

(58) Field of Classification Search
CPC . G02F 1/136204; G02F 1/133; G02F 2202/22
See application file for complete search history.

(56) References Cited

U.S. PATENT DOCUMENTS

2010/0265430 A1* 10/2010 Xu .................... G02F 1/133308
    349/58
2018/0113333 A1* 4/2018 Zhu ................... G02F 1/136286

* cited by examiner

*Primary Examiner* — Donald L Raleigh

(57) ABSTRACT

A liquid crystal display device includes a display panel, a printed circuit board assembly, a chip carrier film structure connected to the display panel and the printed circuit board assembly, a frame, and an electrostatic discharge structure. The electrostatic discharge structure includes a grounding structure disposed on the printed circuit board assembly. A grounding element is electrically connected to a side of the grounding structure of the printed circuit board assembly. A peripheral electrostatic discharge trace is disposed between the frame and the display panel and is connected to the grounding element, and includes a first guiding portion. A voltage regulating element is electrically connected between the grounding structure of the printed circuit board assembly and the first guiding portion of the peripheral electrostatic discharge trace.

12 Claims, 3 Drawing Sheets

LIQUID CRYSTAL DISPLAY DEVICE

BACKGROUND OF INVENTION

1. Field of Invention

The present invention relates to a technical field of displays, and particularly to, a liquid crystal display device having an improved electrostatic discharge structure.

2. Related Art

Liquid crystal displays (LCDs) are one of the most widely used flat panel displays. Traditional LCD panels are generally composed of color film substrates, array substrates, and liquid crystal layers configured between the two substrates. The steering of liquid crystal molecules is controlled using a circuit on the two substrates, and thus images are produced by reflection of light of backlight modules.

Because dense circuits on liquid crystal displays are easily affected by static electricity, ground (GND) metal lines are set for a purpose of quickly releasing the static electricity through the GND metal lines when static voltages are generated, so that static electricity can be quickly released through the GND metal lines, and damage to the inside of panels can be prevented from static electricity accumulation, avoiding adversely affecting display performance. In order to accelerate speed of electrostatic discharge (ESD) and increase platform's ESD capability, LCD layers and each of GND components are configured with multi-point grounding. For example, screw holes of circuit board assembly are connected to GND components of backlight modules to accelerate ESD. This grounding method, while improving ESD, simultaneously increases or enlarges electromagnetic interference (EMI) transmission loop, and increases electromagnetic interference signals transmitted by GND, thereby resulting in a greater interference of electromagnetic radiation throughout the displays.

SUMMARY OF INVENTION

An object of the invention is to provide a liquid crystal display device to improve not only a multi-point grounding structure of the liquid crystal display device, but also electrostatic discharge capability, as well as reduce electromagnetic interference.

In order to achieve the above-mentioned object, the present invention provides liquid crystal display device, comprising a display panel, a printed circuit board assembly, a chip carrier film structure connected to the display panel and the printed circuit board assembly, a frame, and an electrostatic discharge structure, wherein the electrostatic discharge structure comprises a grounding structure disposed on the printed circuit board assembly; a grounding element electrically connected to a side of the grounding structure of the printed circuit board assembly; a peripheral electrostatic discharge trace disposed between the frame and the display panel and connected to the grounding element, wherein the peripheral electrostatic discharge trace comprises a first guiding portion; and a voltage regulating element electrically connected between the grounding structure of the printed circuit board assembly and the first guiding portion of the peripheral electrostatic discharge trace.

Furthermore, the voltage regulating element is a varistor.

Furthermore, the voltage regulating element is a transient voltage suppressor.

Furthermore, the peripheral electrostatic discharge trace further comprises a second guiding portion, and the second guiding portion and the first guiding portion are disposed on opposite sides of the printed circuit board assembly, wherein the voltage regulating element is disposed between the first guiding portion and the second guiding portion and the grounding structure of the printed circuit board assembly.

Furthermore, the chip carrier film structure comprises an electrically conductive element electrically connected to the grounding structure of the printed circuit board assembly, and the display panel comprises an electrically conductive structure electrically connected to the electrically conductive element of the chip carrier film structure.

Furthermore, the liquid crystal display device further comprises a backlight module grounded by the peripheral electrostatic discharge trace and the grounding structure of the printed circuit board assembly.

Furthermore, the liquid crystal display, device is configured to operate in a first operation mode or a second operation mode, wherein the voltage regulating element is open in the first operation mode, and is short-circuited in the second operation mode.

The present invention further provides a liquid crystal display device, comprising a display panel, a printed circuit board assembly, a chip carrier film structure connected to the display panel and the printed circuit board assembly, a frame, and an electrostatic discharge structure, wherein the electrostatic discharge structure comprises a grounding structure disposed on the printed circuit board assembly; a grounding element electrically connected to a side of the grounding structure of the printed circuit board assembly; a peripheral electrostatic discharge trace disposed between the frame and the display panel and connected to the grounding element, wherein the peripheral electrostatic discharge trace comprises a first guiding portion; and a voltage regulating element electrically connected between the grounding structure of the printed circuit board assembly and the first guiding portion of the peripheral electrostatic discharge trace; wherein the peripheral electrostatic discharge trace further comprises a second guiding portion, and the second guiding portion and the first guiding portion are disposed on opposite sides of the printed circuit board assembly, wherein the voltage regulating element is disposed in series between the first guiding portion and the second guiding portion and the grounding structure of the printed circuit board assembly.

Based on the electrostatic discharge structure of the liquid crystal display device of the present invention, the varistors or the transient voltage suppressors are disposed between the printed circuit board assembly and the peripheral electrostatic discharge trace to improve a multi-point grounding configuration among various components of traditional liquid crystal display devices, and to accelerate speed of discharging static electricity of the liquid crystal display device, thereby improving electrostatic discharge capability, reducing a transmission loop of EMI caused by grounding, reducing EMI, and effectively overcoming the problem that traditional display panels not only are prone to electromagnetic interference due to ground interference, but also cause a greater interference of electromagnetic radiation throughout displays.

DESCRIPTION OF PREFERRED EMBODIMENTS

The following embodiments are referring to the accompanying drawings for exemplifying specific implementable embodiments of the present invention. Directional terms described by the present invention, such as upper, lower, front, back, left, right, inner, outer, side, etc., are only directions by referring to the accompanying drawings, and thus the used directional terms are used to describe and understand the present invention, but the present invention is not limited thereto.

Figure 1:
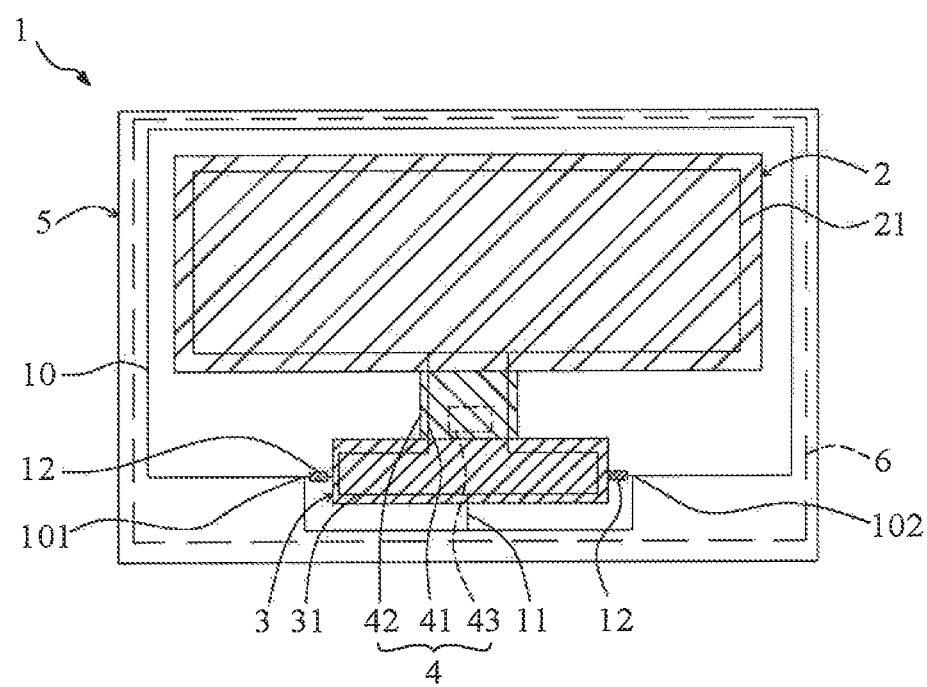
FIG. 1 is a schematic structural view of an electrostatic discharge structure of a liquid crystal display (LCD) device of a preferable embodiment of the present invention.

The present invention provides an electrostatic discharge structure of a liquid crystal display (LCD) device to improve a configuration of a multi-point grounding among various components of the liquid crystal display device, thereby to accelerate speed of electrostatic discharge. FIG. 1 is a schematic structural view of an electrostatic discharge structure of a liquid crystal display (LCD) device of a preferable embodiment of the present invention. An LCD device 1 of the present invention has a general liquid crystal display structure, that is, it includes a display panel 2, a printed circuit board assembly (PCBA) 3, a chip carrier film structure 4 connected to the display panel 2 and the printed circuit board assembly 3, a frame 5, a backlight module 6, and an electrostatic discharge structure. The display panel 2 includes an array substrate configured with a plurality of thin-film transistors, a liquid crystal layer, and a color filter substrate (not shown), and the frame 5 is spaced apart from the display panel 2.

Please continue referring to FIG. 1. The LCD device 1 of the present invention includes an electrostatic discharge structure for discharging static electricity from the LCD device 1. The electrostatic discharge structure includes a peripheral electrostatic discharge trace 10, a grounding element 11, two voltage regulating elements 12, and a grounding structure 31. The grounding structure 31 is disposed on the printed circuit board assembly 3 and along a periphery of the printed circuit board assembly 3, wherein the grounding element 11 is provided in a connector (not shown) directly below the printed circuit board assembly 3, and may be a conductive pin connected to an internal part of the connector. The connector of the printed circuit board assembly 3 is connected to a mating connector on a housing through a flexible circuit board. The peripheral electrostatic discharge trace 10 is disposed between the frame 5 and the display panel 2 and connected to the grounding element 11. Furthermore, the peripheral electrostatic discharge trace 10 includes a first guiding portion 101 and a second guiding portion 102 (as shown in FIG. 1). In this preferable embodiment, the peripheral electrostatic discharge trace 10 is disposed along an inner periphery of the frame 5 and bypasses the printed circuit board assembly 3 to allow the display panel 2, the chip carrier film structure 4, and the printed circuit board assembly 3 to be surrounded by the peripheral electrostatic discharge trace 10. Specifically, the first guiding portion 101 and the second guiding portion 102 are disposed on bypassing locations of the peripheral electrostatic discharge trace 10 close to the printed circuit board assembly 3, respectively, but are not limited thereto.

As shown in FIG. 1, the display panel 2 further includes an electrically conductive structure 21 disposed on edge portions of the display panel 2 for grounding. The chip carrier film structure 4 includes an electrically conductive element 41, a flexible cable 42, and a driver chip 43 disposed on the flexible cable 42. The grounding structure 21 is electrically connected to the electrically conductive element 41, and the electrically conductive element 41 is electrically connected to the grounding structure 31 of the printed circuit board assembly 3. Furthermore, the backlight module 6 is grounded to the ground structure 31 of the printed circuit board assembly 3 through the peripheral electrostatic discharge trace 10. Specifically, the backlight module 6 and the printed circuit board assembly 3 are connected through screw holes for input ground connection, but is not limited thereto.

Figure 3:
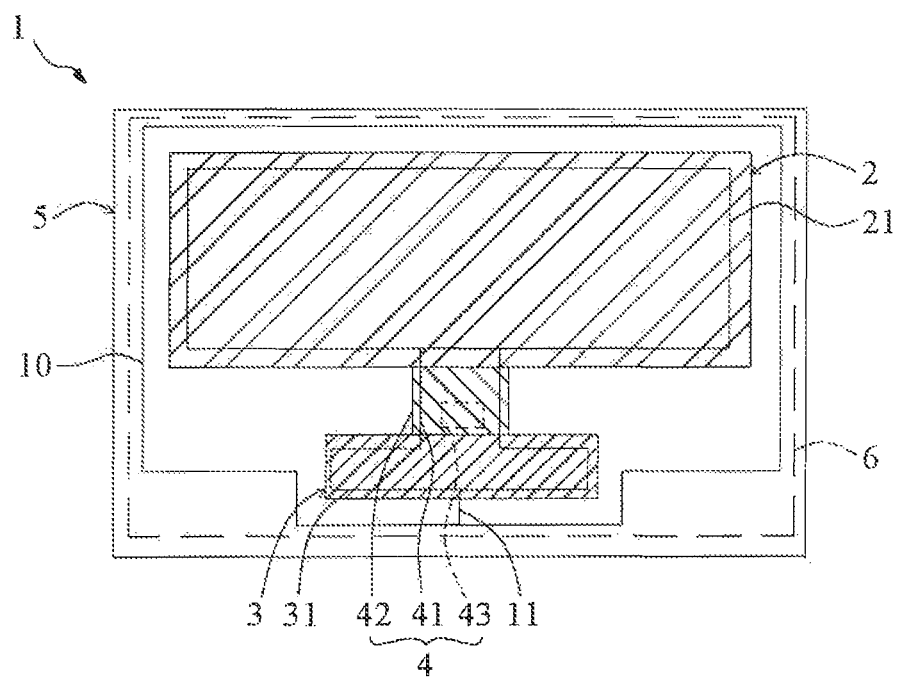
FIG. 3 is a schematic view showing a working state of an electrostatic discharge structure of an LCD device of the present invention.
Figure 4:
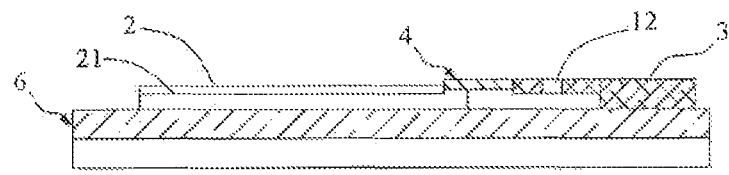
FIG. 4 is a schematic cross-sectional view of an LCD device of an embodiment of the present invention.

Particularly, as shown in FIG. 1, the voltage regulating elements 12 are disposed between the first guiding portion 101 and the second guiding portion 102 and the grounding structure 31 of the printed circuit board assembly 3. Please refer to FIG. 4 showing a schematic cross-sectional view of an LCD device of an embodiment of the present invention. As the cross-sectional view shown in FIG. 4, one side of the voltage regulating element 12 is the chip carrier film structure 4, and the backlight module 6 is below the voltage regulating element 12. Please continue referring to the embodiment as shown in FIG. 1 of which the voltage regulating element 12 is a varistor. The varistor can clamp a voltage to a relatively fixed voltage value when an overvoltage occurs between the two poles of the varistor, thereby achieving circuit protection. Specifically, the liquid crystal display device 1 is configured to operate in a first operation mode or a second operation mode. When the liquid crystal display device 1 operates normally, that is, in the first operation mode, the voltage regulating element 12 (i.e. the varistor) is in an open circuit state and forms an open circuit with the printed circuit board assembly 3. At this time, a grounding status of the entire liquid crystal display device is a single-point ground (as shown in FIG. 3), that is, the grounding is performed only through the grounding element 11, thereby effectively reducing a transmission loop of electromagnetic interference (EMI) caused by grounding, and reducing EMI.

Furthermore, when the voltage regulating element 12 (i.e. the varistor) is in the second operation mode, that is, when static electricity enters a device system, a resistance value of the varistor is very small, which is equivalent to a short-circuit state, and forms a closed circuit with the ground structure 31. At this time, a grounding status of the entire liquid crystal display device is multi-point ground (as shown in FIG. 1), thereby accelerating a speed of electrostatic discharge and effectively protecting the device.

Figure 2:
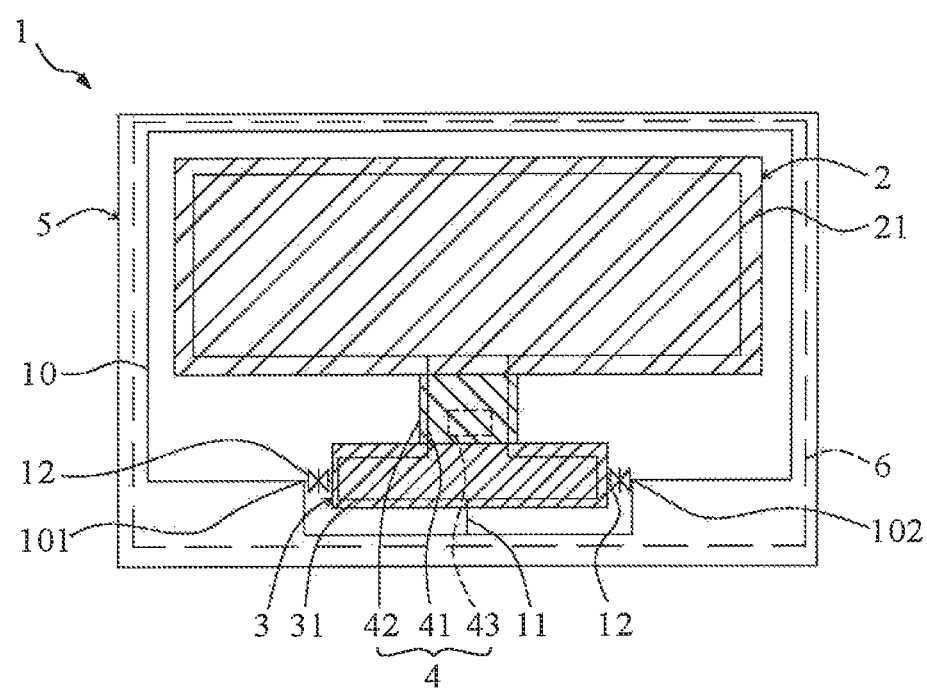
FIG. 2 is a schematic structural view of an electrostatic discharge structure of an LCD device of another preferable embodiment of the present invention.

FIG. 2 is a schematic structural view of an electrostatic discharge structure of an LCD device of another preferable embodiment of the present invention. The difference between the embodiment shown in FIG. 2 and FIG. 1 is that the voltage regulating element 12 in FIG. 2 is a transient voltage suppressor (TVS), and other components and electrostatic discharge structures of the liquid crystal display device are the same as that of the embodiment as shown in FIG. 1 and will not be repeated here. As shown in FIG. 2, a principle that the voltage regulating element 12 (i.e. the TVS) forms a single-point or multi-point ground of the electrostatic discharge structure is the same as that of the embodiment as shown in FIG. 1.

Specifically, as shown in FIG. 2, the voltage regulating elements 12, i.e. TVS, are disposed in series between the first guiding portion 101 and the second guiding portion 102 and the grounding structure 31 of the printed circuit board assembly 3. When the liquid crystal display device 1 operates normally, that is, in the first operation mode, the voltage regulating element 12 (i.e. TVS) is in an open circuit state and forms an open circuit with the printed circuit board assembly 3. At this time, a grounding status of the entire liquid crystal display device is a single-point ground (as shown in FIG. 3), that is, the grounding is performed only through the grounding element 11, thereby effectively reducing a transmission loop of electromagnetic interference (EMI) caused by grounding, and reducing EMI. Likewise, when the voltage regulating element 12 (i.e. the TVS) is in the second operation mode, that is, when static electricity enters a device system, a resistance value of the TVS is very small, which is equivalent to a short-circuit state, and forms a closed circuit with the ground structure 31. At this time, a grounding status of the entire liquid crystal display device is multi-point ground (as shown in FIG. 2), thereby accelerating a speed of electrostatic discharge and effectively protecting the device.

Based on the electrostatic discharge structure of the liquid crystal display device of the present invention, the varistors or the transient voltage suppressors are disposed between the printed circuit board assembly and the peripheral electrostatic discharge trace to improve a multi-point grounding configuration among various components of traditional liquid crystal display devices, and to accelerate speed of discharging static electricity of the liquid crystal display device, thereby improving electrostatic discharge capability, reducing a transmission loop of EMI caused by grounding, reducing EMI, and effectively overcoming the problem that traditional display panels not only are prone to electromagnetic interference due to ground interference, but also cause a greater interference of electromagnetic radiation throughout displays.

Accordingly, although the present invention has been disclosed as a preferred embodiment, it is not intended to limit the present invention. Those skilled in the art without departing from the scope of the present invention may make various changes or modifications, and thus the scope of the present invention should be after the appended claims and their equivalents.

What is claimed is:

1. A liquid crystal display device, comprising:
a display panel, a printed circuit board assembly, a chip carrier film structure connected to the display panel and the printed circuit board assembly, a frame, and an electrostatic discharge structure, wherein the electrostatic discharge structure comprises:
a grounding structure disposed on the printed circuit board assembly;
a grounding element electrically connected to a side of the grounding structure of the printed circuit board assembly;
a peripheral electrostatic discharge trace disposed between the frame and the display panel and connected to the grounding element, wherein the peripheral electrostatic discharge trace comprises a first guiding portion; and
a voltage regulating element electrically connected between the grounding structure of the printed circuit board assembly and the first guiding portion of the peripheral electrostatic discharge trace.

2. The liquid crystal display device of claim 1, wherein the voltage regulating element is a varistor.

3. The liquid crystal display device of claim 1, wherein the voltage regulating element is a transient voltage suppressor.

4. The liquid crystal display device of claim 1, wherein the peripheral electrostatic discharge trace further comprises a second guiding portion, and the second guiding portion and the first guiding portion are disposed on opposite sides of the printed circuit board assembly, wherein the voltage regulating element is disposed between the first guiding portion and the second guiding portion and the grounding structure of the printed circuit board assembly.

5. The liquid crystal display device of claim 1, wherein the chip carrier film structure comprises an electrically conductive element electrically connected to the grounding structure of the printed circuit board assembly, and the display panel comprises an electrically conductive structure electrically connected to the electrically conductive element of the chip carrier film structure.

6. The liquid crystal display device of claim 1, wherein the liquid crystal display device further comprises a backlight module grounded by the peripheral electrostatic discharge trace and the grounding structure of the printed circuit board assembly.

7. The liquid crystal display device of claim 1, wherein the liquid crystal display device is configured to operate in a first operation mode or a second operation mode, wherein the voltage regulating element is open in the first operation mode, and is short-circuited in the second operation mode.

8. A liquid crystal display device, comprising:
a display panel, a printed circuit board assembly, a chip carrier film structure connected to the display panel and the printed circuit board assembly, a frame, and an electrostatic discharge structure, wherein the electrostatic discharge structure comprises:
a grounding structure disposed on the printed circuit board assembly;
a grounding element electrically connected to a side of the grounding structure of the printed circuit board assembly;
a peripheral electrostatic discharge trace disposed between the frame and the display panel and connected to the grounding element, wherein the peripheral electrostatic discharge trace comprises a first guiding portion; and
a voltage regulating element electrically connected between the grounding structure of the printed circuit board assembly and the first guiding portion of the peripheral electrostatic discharge trace;
wherein the peripheral electrostatic discharge trace further comprises a second guiding portion, and the second guiding portion and the first guiding portion are disposed on opposite sides of the printed circuit board assembly, wherein the voltage regulating element is disposed in series between the first guiding portion and the second guiding portion and the grounding structure of the printed circuit board assembly.

9. The liquid crystal display device of claim 8, wherein the voltage regulating element is a varistor.

10. The liquid crystal display device of claim 8, wherein the voltage regulating element is a transient voltage suppressor.

11. The liquid crystal display device of claim 8, wherein the chip carrier film structure comprises an electrically conductive element electrically connected to the grounding structure of the printed circuit board assembly, and the display panel comprises an electrically conductive structure electrically connected to the electrically conductive element of the chip carrier film structure.

12. The liquid crystal display device of claim 8, wherein the liquid crystal display device is configured to operate in a first operation mode or a second operation mode, wherein the voltage regulating element is open in the first operation mode, and is short-circuited in the second operation mode.

* * * * *